United States Patent [19]
Skrobak

[11] Patent Number: 5,178,512
[45] Date of Patent: Jan. 12, 1993

[54] PRECISION ROBOT APPARATUS

[75] Inventor: Lubomir Skrobak, Mountain View, Calif.

[73] Assignee: Equipe Technologies, Mountain View, Calif.

[21] Appl. No.: 678,750

[22] Filed: Apr. 1, 1991

[51] Int. Cl.⁵ .............................................. B25J 18/00
[52] U.S. Cl. ............................. 414/744.5; 414/744.3; 414/749; 901/21; 901/25
[58] Field of Search ............... 414/744.3, 744.5, 744.8, 414/749, 751–753; 901/15, 23, 25, 21; 74/479

[56] References Cited

U.S. PATENT DOCUMENTS

| | | | |
|---|---|---|---|
| 4,466,769 | 8/1984 | Inaba et al. | 414/744.3 |
| 4,566,847 | 1/1986 | Maeda et al. | 414/744.3 |
| 4,787,813 | 11/1988 | Stevens et al. | 901/21 X |
| 4,921,395 | 5/1990 | Sahlin | 414/744.3 |
| 5,017,083 | 5/1991 | Sahlin | 414/744.3 |

Primary Examiner—Robert J. Spar
Assistant Examiner—Donald W. Underwood
Attorney, Agent, or Firm—Michael J. Hughes

[57] ABSTRACT

A precision robot apparatus (10) is disclosed which has an arm supporting cylinder (16) capable of being moved vertically by means of a lead screw (24) which rotates within a lead screw nut (38) attached to the arm supporting cylinder (16). A linear guide rod (44) is positioned parallel to the arm supporting cylinder (16) with an anti-rotation plate (42) therebetween. An arm drive belt (74) transfers rotational power from the linear guide rod (44) to the arm supporting cylinder (16). Rotational motion of the arm supporting cylinder (16) relative to a fixed arm pulley (92) is employed to power an arm portion (14).

11 Claims, 2 Drawing Sheets

PRECISION ROBOT APPARATUS

TECHNICAL FIELD

The present invention relates generally to the field of robotics, and more particularly to an improved robot device for moving objects in three dimensions as a part of a manufacturing process. The predominant current usage of the precision robot apparatus of the present invention is as a wafer handling device during the manufacture of semiconductor chips.

BACKGROUND ART

The increasing automation of most manufacturing processes has spawned a great variety of robotic devices for handling materials and parts during such procedures. These range from heavy duty industrial devices to smaller precision devices, and they may be designed to accomplish a single specific purpose or to be of a more general utility. A subclass of such devices are robotic arms which are designed to position an object at any point within a fixed cylindrical space. An example of this latter sort of device is taught by U.S. Pat. No. 4,813,845 issued to Swain, which teaches a unique means for moving objects within a planar circular zone and provides for the addition of a conventional elevator mechanism as a means to extend the movement along the vertical longitudinal axis of a cylindrical zone.

In the semiconductor manufacturing industry, materials handling robots may be used for a number of purposes. Primary among these is the handling of silicon wafers. Of course, this procedure is done in a clean room environment and it requires that the robot be capable of a great deal of precision of movement. The most common type of apparatus currently in use for this purpose is a general purpose robot having a vertical cylinder with means for rotating the cylinder (around a "θ" axis) and means for elevating the cylinder (along a vertical or "Z" axis), as desired. Additionally, a means is provided for extending and retracting an arm with an object carrying hand at its end within a planar circular zone (as for example, along an "R" axis, which is here defined as being a path described by a radius of the planar circular zone within which the object carrying hand may be moved), which zone is perpendicular to the vertical axis of the cylinder and has its center located at the junction of the top of the cylinder and the cylinder's vertical center axis. While such robotic devices are provided by various manufacturers and thus vary in many respects, all of the prior art devices here being discussed share the characteristics heretofore described. Indeed, it is considered to be necessary that such devices adhere to this general configuration, as the market demands that such devices be "interchangeable" in the sense that a new entry into the market place should be capable of movement within a zone similar to that attainable by existing machines.

However, such devices as have existed in the prior art embody several undesirable qualities. One of these is that the means for powering the arm and hand reside within the cylinder. This means that the mass of the cylinder is considerable, which adds to the rotating mass of the cylinder and places a great deal of that mass toward the top of the cylinder. The increased mass is undesirable because it increases inertia of the cylinder and thus reduces the responsiveness thereof to control signals, which may be manifested by an increase in what is known in the art as "following error". The fact that the center of mass of the cylinder is shifted toward the top is undesirable because it increases the need for support at the top of the cylinder to prevent wobble in the cylinder top. Indeed, all of the prior art devices within the inventor's knowledge have required cam follower type devices located around the perimeter of the cylinder to support the cylinder. These cam follower devices are themselves a source of potential problems, as they tend to become less precise with wear and can contribute contaminants to the environment as a result of such wear or because of lubricants used in conjunction therewith. Furthermore, the cam followers and their housings add considerable mass to the apparatus, which detracts from its responsiveness. Also, placement of a motor within the cylinder contributes to unwanted contaminants, as motors are themselves sources of contaminating particles. Prior to the present invention, it has been considered to be necessary to use supporting means at or near the top of a housing for supporting the Z axis traversing mechanism.

All of the prior art cylindrical area robotic devices within the inventor's knowledge have had arm powering means located within the cylinder and/or have required supporting means near the top of the cylinder housing.

No prior art cylindrical area robotic device configuration to the inventor's knowledge has successfully removed the means for producing or transferring power for Z axis motion from within that portion of the device which carries the arm along the Y axis. All successful applications to date have further required a supporting means located at or near the top of the Z axis cylinder housing (or equivalent mechanism).

DISCLOSURE OF INVENTION

Accordingly, it is an object of the present invention to provide a robotic device which does not contaminate the environment with wear products or lubricants from Z axis support mechanisms or R axis motors.

It is another object of the present invention to provide a robotic device which does not tend to wear excessively such that it tends to wobble about its Z axis after prolonged use.

It is still another object of the present invention to provide a robotic device which is very responsive to control signals.

It is yet another object of the present invention to provide a robotic device which can replace existing robotic devices in wafer handling and related applications.

It is still another object of the present invention to provide a robotic device which minimizes following error.

It is yet another object of the present invention to provide a means for handling objects during a manufacturing process which is inexpensive to manufacture and reliable in operation.

Briefly, the preferred embodiment of the present invention is a robotic device which is similar in appearance to conventional cylindrical area robotic material handling devices. The inventive robot has a housing with an aperture on its top from which a vertical cylinder is extended and withdrawn to provide movement along a Z axis. In the present invention, Θ axis movement is effectuated by rotating a Z axis assembly, and movement along a radius of a planar circular zone (R axis) is provided by rotating the vertical cylinder while a reference anchor point remains fixed relative to the rotating vertical cylinder. By providing a means for Θ axis movement (rotation) which is not dependent upon rotation of the vertical cylinder, rotation of the vertical cylinder can itself be used as a means for powering movement of an arm along the R axis. This means that a means for powering the arm along the R axis need not be housed within the vertical cylinder itself.

The inventor has found that, by moving mass out of the vertical cylinder and by precision machining of a center lead screw, and by properly supporting the lead screw, it is possible to eliminate any supporting means for the vertical cylinder at or near the top of the housing. This contributes to the durability of the unit, as cam followers and the like which are conventionally used to support the vertical cylinder tend to wear and allow the vertical cylinder to move about other than the horizontal Z axis. Furthermore, this eliminates the friction caused by cam followers and reduces rotational mass, thereby making the unit more responsive. Furthermore, the undesirable byproducts of the lubricant and wear products from such cam followers are thereby eliminated.

An advantage of the present invention is that it does not contaminate the environment with wear products or lubricants from Z axis support mechanisms.

A further advantage of the present invention is that all motors are kept below materials to be handled at all times, thus insuring that laminar flow air circulation systems will conduct any contaminants produced by the motors away from the object materials.

Yet another advantage of the present invention is that it does not tend to wear excessively such that it tends to wobble about its Z axis after prolonged use.

Still another advantage of the present invention is that it is very responsive to control signals.

Yet another advantage of the present invention is that it can replace existing robotic devices in wafer handling and related applications.

Still another advantage of the present invention is that following error is minimized.

Yet another advantage of the present invention is that it is inexpensive to manufacture and reliable in operation.

These and other objects and advantages of the present invention will become clear to those skilled in the art in view of the description of the best presently known modes of carrying out the invention and the industrial applicability of the preferred embodiments as described herein and as illustrated in the several figures of the drawing, in which like reference designations represent like features throughout.

BEST MODE FOR CARRYING OUT INVENTION

The best presently known mode for carrying out the invention is a precision robot apparatus having a unique combination of means for imparting motion to an end effector. The predominant expected usage of the inventive precision robot apparatus is in the semiconductor manufacturing and processing industry, particularly in the handling of silicon wafers and the like wherein extreme sensitivity and precision of movement is desirable.

Figure 1:
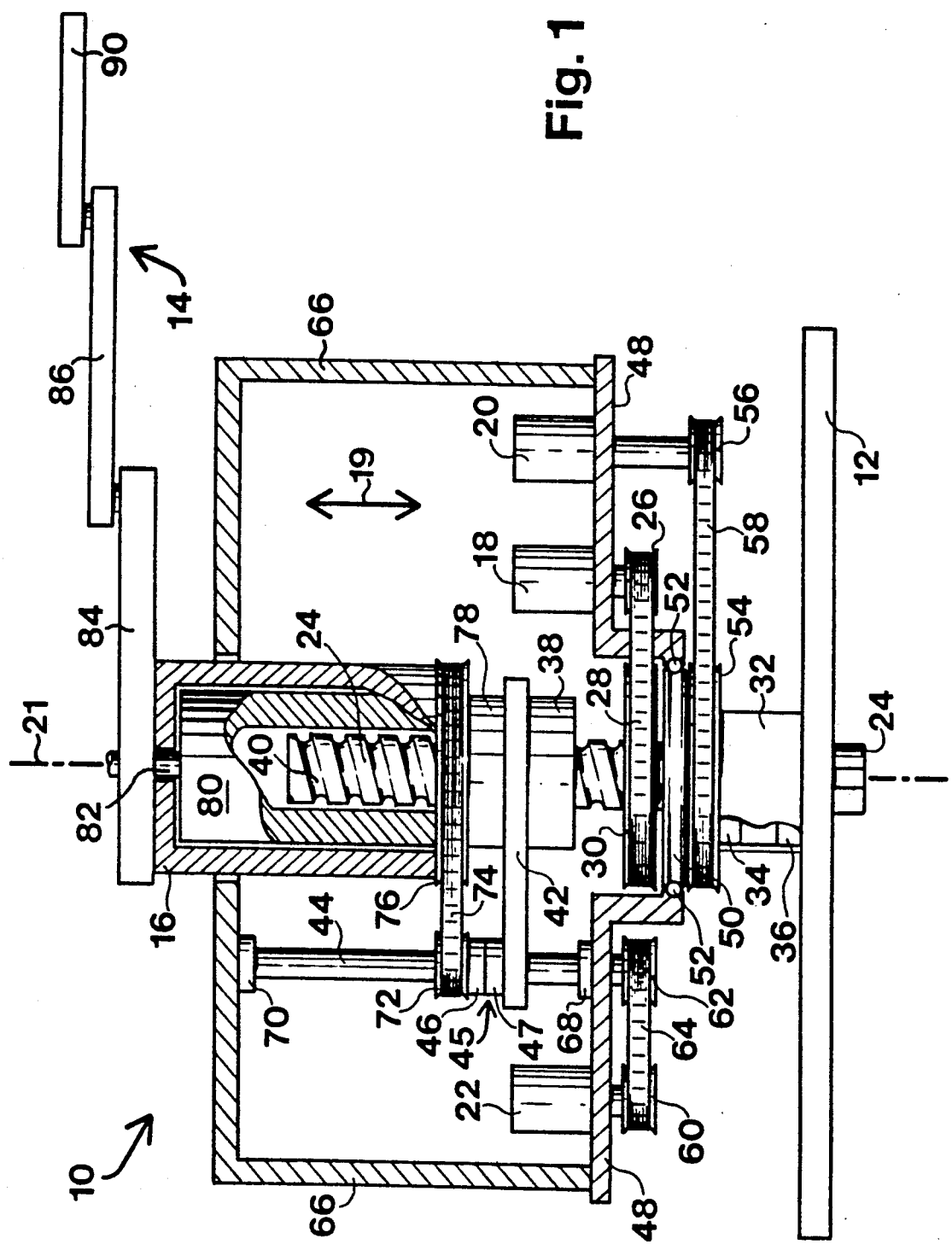
FIG. 1 is a partially cut away cross sectional elevational view of a cylindrical zone precision robot apparatus, according to the present invention.

The precision robot apparatus of the presently preferred embodiment of the present invention is illustrated in a partially cut away cross sectional elevational view in FIG. 1 and is designated therein by the general reference character 10. In many of its substantial components, the precision robot apparatus 10 does not differ significantly from conventional cylindrical zone type robot devices. The physical structure is similar in appearance to that of prior art cylindrical zone type robotic devices, although parts of the inventive robot apparatus 10 perform quite different functions as compared to corresponding portions of prior art devices, as will be discussed hereinafter. It should be noted that the drawing of FIG. 1 shows various components of the best presently known embodiment 10 of the invention somewhat more dispersed than they are found in the actual physical embodiment of the best presently known embodiment 10 of the present invention so that the precision robot 10 may be illustrated in two dimensions and thus the inventive principles and structure may be more clearly depicted.

Elements of the precision robot apparatus 10 which roughly correspond to similar portions of prior art devices include a stationary base platform 12, an arm portion 14 and an arm supporting cylinder 16. As are found in many prior art devices, the best presently known embodiment 10 of the invention uses a Z motor 18 for providing power for movement in a vertical direction which vertical direction is indicated in the drawing of FIG. 1 by a vertical arrow 19, a Θ motor 20 for providing rotational movement around a rotational axis 21, and an arm motor 22 for extending and retracting the arm portion 14. Of course, just as is the case with prior art devices, the inventive principles are not dependent upon the particular arrangement of power source found in the presently preferred embodiment 10 of the present invention. For example, a system having but a single power source and a system of clutch devices might well be substituted for the three motors 18, 20 and 22 while still retaining the inventive construction. As can be appreciated by one skilled in the art, the motors 18, 20 and 22 are activated, as needed, under computer control to produce desired movement through the inventive robot apparatus 10, as will be described hereinafter.

A lead screw 24 is provided as a means for imparting vertical movement, as is customary in many such devices. Power is transferred from the Z motor 18 to the lead screw 34 through a Z motor drive pulley 26, a Z drive belt 28 and a Z direction driven pulley 30. The lead screw driven pulley 30 is keyed to the lead screw 24 such that the lead screw 24 is caused to rotate when the Z motor is activated. The lead screw 24 is rotatably affixed to the stationary platform 12 within a lead screw support housing 32 which has an upper lead screw bearing 34 and a lower lead screw bearing 36 such that the lead screw 24 is free to turn within the lead screw bearings 34 and 36, while the lead screw support housing 32 is rigidly affixed to the stationary platform 12.

A threaded lead screw nut 38 is mated to a lead screw thread 40 such that when the lead screw 24 is rotated, the lead screw nut is caused to moved vertically, either up or down depending upon direction of rotation of the lead screw 24. The lead screw nut 38 is of a well known type known as a "ball screw" nut, which serves to reduce friction between the lead screw nut 38 and the lead screw 24. An anti-rotation plate 42 is connected between the lead screw nut 38 and a vertical linear guide rod 44 for preventing rotation of the lead screw nut 38. An anti-rotation bearing assembly 45 allows the anti-rotation plate 42 to move up and down on the vertical linear guide rod 44 and further allows the vertical linear guide rod 44 to rotate within the anti-rotation bearing assembly 45. The anti-rotation bearing assembly 45 has a linear bearing 46 for allowing motion up and down along the vertical linear guide rod 44, and a rotational bearing for allowing rotation of the vertical linear guide rod 44 within.

As can be seen in the drawing of FIG. 1, a rotating platform 48 is rotatably affixed to a rotating platform mounting housing 50 using a rotating platform bearing 52. In the presently preferred embodiment 10 of the invention, the rotating platform mounting housing 50 is case as a single unit with the lead screw support housing 32. It should be noted that the rotating platform 48, which is shown in cross section in the view of FIG. 1, is formed so as to allow passage of the Z drive belt 28 therethrough.

A Θ axis fixed pulley 54 is rigidly affixed to the lead screw support housing 32 and the rotating platform mounting housing 50 is rigidly affixed to the Θ axis fixed pulley 54 such that the Θ axis fixed pulley 54, the lead screw support housing 32 and the rotating platform mounting housing 50 are all rigidly attached in relation to the stationary platform. When power is applied to the Θ motor 20 (which, as can be seen in the view of FIG. 1, is rigidly mounted to the rotating platform 48), power is applied through a Θ drive pulley 56 and a Θ drive belt 58 to the Θ axis fixed pulley 54. Since the Θ axis fixed pulley 54, as has been previously disclosed, is not rotatable in relation to the stationary platform 12, application of power from the θ motor 20 causes the rotating platform 48 to rotate about the rotational axis 21.

In the best presently known embodiment 10 of the present invention, the arm motor 22, Which is also mounted on the rotating platform 48, turns a first arm drive pulley 60, which then turns a first arm driven pulley 62 by means of a first arm drive belt 64. The first arm driven pulley 62 is keyed to the vertical linear guide rod 44 such that the vertical linear guide rod 44 is caused to rotate when power is applied from the arm motor 22. The vertical linear guide rod 44 is rotatably attached to the rotating platform 48 and to a vertical linear guide rod support housing 66 (shown in cross section in the view of FIG. 1) by means of a lower guide rod bearing 68 and an upper guide rod bearing 70, respectively. A second arm drive pulley 72 is slidably attached to the vertical linear guide rod 44 and is further attached to the anti-rotation bearing assembly 45 and the anti-rotation plate 42 such that the second arm drive 72 pulley slides up and down on the vertical linear guide rod 44 with the anti-rotation plate 42. The second arm drive pulley 72 is also keyed to the vertical linear guide rod 44 such that the second arm drive pulley 72 rotates with the vertical linear guide rod 44, and rotational power imparted to the vertical linear guide rod 44 through the first arm driven pulley 62 is also imparted to the second arm drive pulley 72. As can be seen in the view of FIG. 1, the second arm drive pulley 72 powers a second arm drive belt 74, which turns a second arm driven pulley 76.

The second arm driven pulley 76 is rigidly affixed to the arm supporting cylinder 16 such that the arm supporting cylinder 16 rotates when rotational power is supplied from the arm motor 22. The arm supporting cylinder 16 is rotatably mounted in relation to the lead screw nut 38 and the anti-rotation plate 42 by an arm supporting cylinder bearing assembly 78. An inner cylinder 80 is rigidly affixed relative to the arm supporting cylinder bearing assembly 78 such that the inner cylinder 80 does not rotate with the arm supporting cylinder 16, but rather remains in a fixed relationship to the lead screw nut 38. Therefore, the arm supporting cylinder 16 is rotatably attached in relation to the inner cylinder 80.

A fixed pulley shaft 82 is rigidly affixed to the inner cylinder 80. A first arm segment 84 is rigidly affixed to the arm supporting cylinder 16 such that the first arm segment 84 is caused to rotate about the rotational axis 21 when the arm supporting cylinder 16 rotates. Therefore, a relative rotary motion is created locally at the fixed pulley shaft 82 when the arm supporting cylinder 16 rotates in relation to the inner cylinder 80. A second arm segment 86 and an end effector 90 will be discussed hereinafter, in relation to FIG. 2.

The arm portion 14 utilized as a part of the presently preferred embodiment 10 of the present invention is a conventional prior art device such as is commonly used in many prior art cylindrical zone type robotic devices. The application of the arm portion 14 to the presently preferred embodiment 10 of the present invention varies from similar prior art applications primarily in the means of transferring motive force from the arm motor 22 to the first arm segment 84. It should be understood that the arm portion 14 is not considered by the inventor to be unique to the present invention, nor is the present invention limited by the particular type or arrangement of arm portion 14 which is utilized with the presently preferred embodiment 10 of the present invention. For example, the present invention could easily be utilized with a single link type arm assembly (not shown), a 3 link arm assembly (not shown) or a linear extending arm assembly (not shown).

Figure 2:
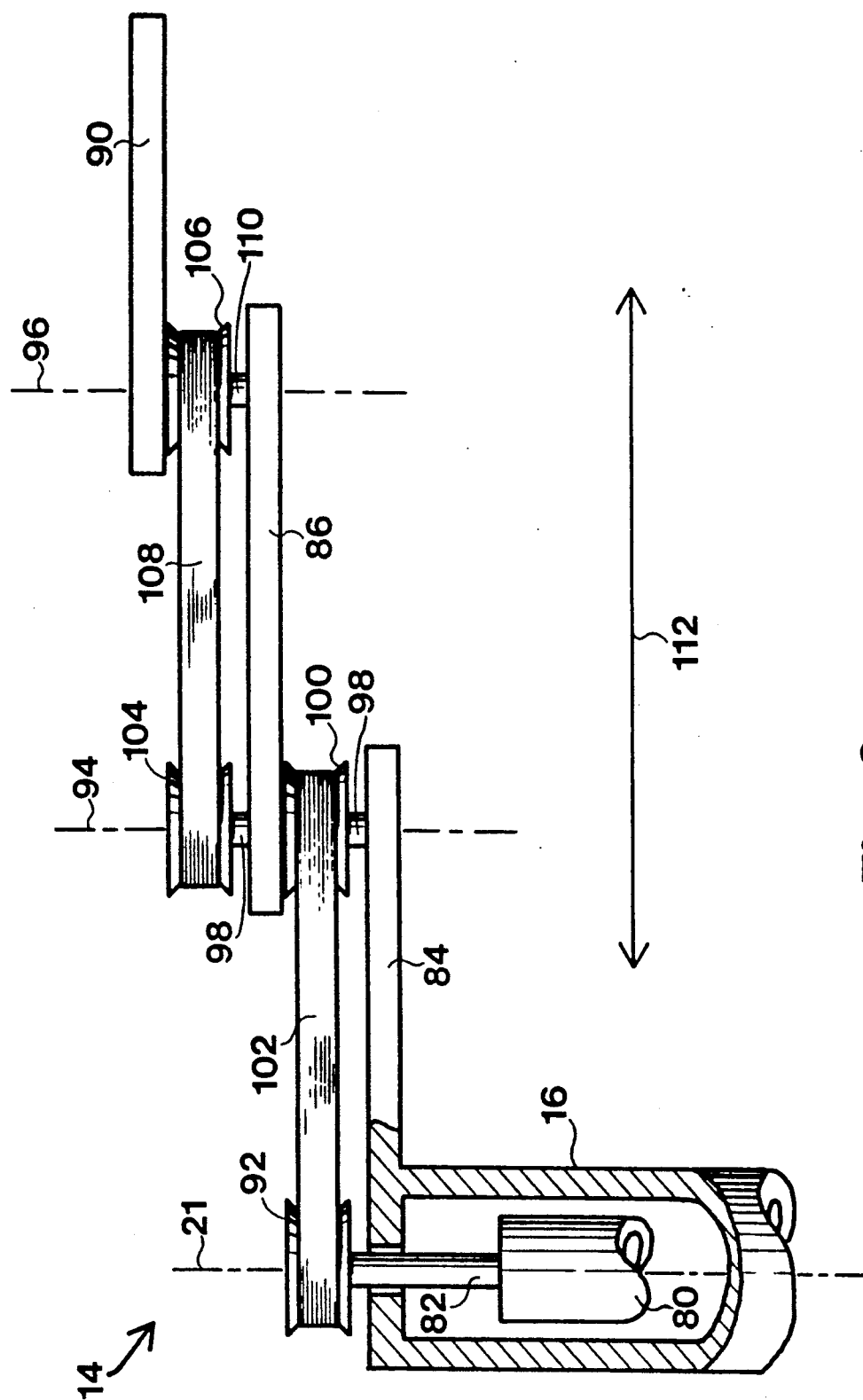
FIG. 2 is a cross sectional elevation view of a robotic arm portion as utilized in the presently preferred embodiment of the present invention.

The arm portion 14 of the presently preferred embodiment 10 of the present invention is shown in a cross sectional elevational view in FIG. 2. The arm portion 14 is depicted in FIG. 2 in its fully extended mode. As has been previously disclosed, the fixed pulley shaft 82 is rigidly attached to the inner cylinder 80. In the view of FIG. 2, it can be seen that the fixed pulley shaft 82 is also rigidly attached to a fixed arm pulley 92. Also, as has been previously disclosed, the first arm segment 84 is rigidly affixed to the arm supporting cylinder 16. Therefore, when the arm supporting cylinder 16 is rotated about the rotational axis 21, the first arm segment 84 is rotated about the rotational axis 21 while the fixed arm pulley 92 remains stationary.

The second arm segment 86 is rotatably mounted to the first arm segment 84 such that it can rotate about a first arm segment pivot axis 94. Similarly, the end effector 90 is rotatably mounted to the second arm segment 86 such that it can rotate about a second arm segment pivot axis 96. A first arm segment pulley shaft 98 is rigidly affixed to the first arm segment 84. A second arm segment driven pulley 100 is rigidly affixed to the second arm segment 86 and is free to rotate about the first arm segment pulley shaft 98. A first arm segment drive belt 102 connects the fixed arm pulley 92 to the second arm segment driven pulley 100.

A first arm segment drive pulley 104 is rigidly affixed to the first arm segment pulley shaft 98, and an end effector driven pulley 106 is rigidly affixed to the end effector 90. A second arm segment drive belt 108 connects the first arm segment drive pulley 104 to the end effector driven pulley 106. The end effector 90 and the end effector driven pulley 106 are free to rotate about a second arm segment pulley shaft 110, which is rigidly affixed to the second arm segment 86.

In the presently preferred embodiment 10 of the invention, the distance from the rotational axis 21 to the first arm segment pivot axis 94 is equal to the distance from the first arm segment pivot axis 94 to the second arm segment pivot axis 96, and the ratio of circumferences of the fixed arm pulley 92 to that of the first arm segment driven pulley 100 is 2:1, while the ratio of the first arm segment drive pulley 104 to that of the end effector driven pulley 106 is 1:2. This results in movement of the end effector 90, when the arm supporting cylinder 16 is rotated about the rotational axis 21, linearly parallel to a plane indicated by a radius plane arrow 112. One skilled in the art will recognize that any of the pulley ratios and/or relative dimensions cited herein as being used in the arm portion 14 of the presently preferred embodiment 10 of the invention could be easily changed, with appropriate corrections to the remaining dimensions and/or ratios, to achieve the same result.

In the presently preferred embodiment 10 of the invention, the end effector 90 is a conventional vacuum pick up device for handling semiconductor wafers (not shown). The end effector 10 is not unique to the present invention, and any of a great variety of different end effectors 90, such as mechanical grasping hands, and the like, might be readily adapted to the present invention.

The inventor has found that by precisely machining the lead screw 24 and the lead screw nut 38, the present inventive construction permits the elimination of any supporting structure or devices along the outer surface of the arm supporting cylinder 16. The inventor has further found that, by removing the arm motor 22 and related components from within the arm supporting cylinder 16, as is accomplished within the present invention, responsiveness of the precision robot apparatus 10 is improved as compared to that of prior art devices, and following error and related problems are reduced.

As is shown above, in great part, the precision robot apparatus 10 according to the present invention closely resembles prior art conventional cylindrical area robotic devices in many respects, particularly in superficial appearance. The substantial difference exists in the inclusion of a means for transferring power to the arm portion 14 by rotation of the arm supporting cylinder 16, and in the related means for providing vertical movement of the arm portion 14. No significant changes of materials are envisioned nor are any special constructions required.

Various modifications may be made to the invention without altering its value or scope. For example, construction of the arm portion 14 might be altered, as suggested herein or according to any prior art arm construction or any arm construction yet to be invented.

Another possible modification would be to adapt an arm to use the relative rotational motion of the arm supporting cylinder 16 in relation to the inner cylinder so to open and close a gripping hand (not shown). Of course, this modification would result in sacrifice of movement along the radius plane 112. However, in many manufacturing situations movement from one fixed point to another is all that is required. If both of these fixed points can be located at a fixed radial distance from the rotational axis 21, this adaption would be quite practical.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The precision robot apparatus is widely used in the semiconductor manufacturing industry. The predominant current usages are for handling semiconductor wafers and the like during manufacturing and processing.

The precision robot apparatus of the present invention may be utilized in any application wherein conventional cylindrical area robotic devices are used. Indeed, it is considered to be essential that the inventive device be essentially functionally interchangeable with existing devices in order to perform the functions which have been assigned such existing devices. The main area of improvement is in the removal of means for providing arm movement from within the arm supporting cylinder, thus improving responsiveness of the arm portion and removing sources of particle contamination from the environment, and further in providing a means for imparting vertical movement to the arm supporting cylinder which does not require supporting the cylinder along its sides, thus increasing the reliability and longevity of the device and decreasing emission of contaminants into a clean room environment.

Since the precision robot device of the present invention may be readily constructed and is physically significantly similar to prior art conventional cylindrical area robot devices it is expected that they will be acceptable in the industry as substitutes for the conventional cylindrical area robot devices. It should be noted that in order to achieve the advantages described herein, the inventive construction does sacrifice some degree of overall power in order to increase responsiveness and precision of movement. However, in the applications for which the precision robot apparatus is intended, precision of movement and responsiveness are of primary importance, while a need to handle heavy parts with the apparatus generally does not exist. Therefore, the inventor believes that users of cylindrical area robot devices will find the precision robot device of the present invention to be superior in overall performance as compared to any prior art device. For these and other reasons, it is expected that the utility and industrial applicability of the invention will be both significant in scope and long-lasting in duration.

I claim:
1. An object transport apparatus, comprising:
a stationary portion;
a rotating stage rotatably affixed to said stationary portion such that said rotating stage may be rotated about a rotational axis;
a lead screw rotatably affixed to the stationary portion coaxially about said rotational axis, and further such that the lead screw may be independently rotated about said rotational axis relative to the rotating stage;
a lead screw nut threaded onto the lead screw and affixed to the rotating stage by an anti-rotation means such that the lead screw nut is prevented from rotating about said rotational axis relative to the rotating stage, and further such that the lead screw nut is free to move axially along said rotational axis as the lead screw rotates within the lead screw nut;

an arm actuating means rotatably affixed to the lead screw nut such that at least a portion of the arm actuating means may be rotated about said rotational axis relative to the lead screw nut;

a first motive means for rotating the rotating stage relative to the stationary portion;

a second motive means for rotating the lead screw relative to the stationary portion; and a third motive means for rotating the arm actuating means relative to the lead screw nut.

2. The object transport apparatus of claim 1, wherein;

said anti-rotation means includes a guide rod positioned parallel to said rotational axis and affixed to the rotating stage such that said guide rod moves about said rotational axis with the rotating stage; and an anti-rotation appendage rigidly affixed to the lead screw nut and further slidably affixed to said guide rod such that said anti-rotation appendage is free to slide longitudinally along said guide rod.

3. The object transport apparatus of claim 2, wherein:

said guide rod is rotatably affixed to the rotating stage such that said guide rod may be rotated about a guide rod longitudinal axis which is parallel to said rotational axis; and the third motive means includes;

an arm power source;

an intermediate power transfer means for transferring rotational power from said arm power source to said guide rod, and thus for causing said guide rod to rotate about said guide rod longitudinal axis; and an arm power transfer means for transferring rotational power from said guide rod to said arm actuating means, and thus for causing said arm actuating means to rotate about said rotational axis.

4. The object transport apparatus of claim 1, wherein:

the arm actuating means is a tubular sleeve positioned so as to be coaxial with said rotational axis.

5. The object transport apparatus of claim 1, and further including:

an arm rigidly affixed to the arm actuating means and extending therefrom perpendicular to said rotational axis; and a pinion positioned so as to be coaxial with the rotational axis and affixed such that said pinion is stationary relative to the lead screw nut such that, when the arm actuating means is rotated about said rotational axis relative to the lead screw nut, said arm rotates about said rotational axis relative to said pinion, wherein;

said pinion is so positioned and affixed by means of an inner cylinder, said inner cylinder being a tubular sleeve positioned coaxially in relation to said rotational axis, and rigidly affixed at one end relative to the lead screw nut such that the lead screw is free to rotate within said inner cylinder and further having said pinion rigidly affixed thereto at an opposite end such that said pinion is coaxial with said rotational axis.

6. The object transport apparatus of claim 5, wherein:

said arm is terminated at its distal end by an end effector for selectively picking up and releasing the transported object.

7. The object transport apparatus of claim 5, and further including:

an arm extension means for translating relative rotational motion of said arm relative to said pinion into linear motion such that at least a portion of said arm is extended and retracted along a line lying perpendicular to said rotational axis, depending upon the direction of the relative rotational motion.

8. The object transport apparatus of claim 7, wherein:

said arm extension means is a rotary to linear motion robotic arm.

9. The object transport apparatus of claim 1, wherein:

the first motive means, the second motive means, and the third motive means include three independently controllable reversible electric motors with belt and pulley means for transferring rotational power from said motors to, respectively, the rotating stage, the lead screw, and the arm actuating means.

10. The object transport apparatus of claim 1, wherein:

the first motive means includes;

an electric motor rigidly affixed to the rotating stage, said electric motor having a motor pulley which rotates, as powered by said electric motor, relative to the rotating stage;

a fixed pulley which is affixed such that it is coaxial with said rotational axis and is stationary relative to the stationary portion; and a drive belt for transferring power from said motor pulley to said fixed pulley such that, when said electric motor causes said motor pulley to rotate, the rotating stage is caused to rotate about said rotational axis relative to the stationary portion.

11. A robotic apparatus for rotating an arm about a rotational axis, and further for moving the arm longitudinally along the rotational axis, and further for transferring power form an arm power means to said arm for enabling motion of the arm, comprising:

a lead screw;

a lead screw power means for rotating the lead screw about the rotational axis relative to a fixed base;

a lead screw nut threaded on the lead screw for moving longitudinally along the rotational axis as the lead screw rotates;

a rotating platform rotatably affixed to the fixed base such that the rotating platform may be rotated about the rotational axis independent of the lead screw;

rotating platform power means for rotating the rotating platform about the rotational axis;

anti-rotation means connected between the lead screw nut and the rotating platform such that the lead screw nut is prevented form rotating about the rotational axis relative to the rotating platform;

an arm actuator rotatably affixed to the lead screw nut such that the arm actuator may be rotated about the rotational axis; and arm actuator power transfer means for transferring power form the arm power means to the arm actuator for rotating the arm actuator about the rotational axis such that relative rotational motion between the arm actuator and the lead screw nut is produced, by which relative rotational motion the arm may optionally be powered, wherein;

the anti-rotation means includes an anti-rotation plate rigidly affixed to the lead screw nut and further slidably affixed to a guide rod, the guide rod being a rod affixed to the rotating platform so as to be parallel to the rotational axis, such that the lead screw nut is caused to rotate in unison with the rotating platform and further such that the lead screw nut is free to move longitudinally along the rotational axis as the lead screw is threaded through the lead screw nut.

* * * * *